(12) United States Patent
Chen et al.

(10) Patent No.: US 8,438,847 B2
(45) Date of Patent: May 14, 2013

(54) HEAT-PIPE ELECTRIC POWER GENERATING DEVICE AND HYDROGEN/OXYGEN GAS GENERATING APPARATUS AND INTERNAL COMBUSTION ENGINE SYSTEM HAVING THE SAME

(75) Inventors: Yao-Shun Chen, Hsinchu County (TW); Wen-Yang Peng, Taipei County (TW); Ra-Min Tain, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 795 days.

(21) Appl. No.: 12/641,324

(22) Filed: Dec. 18, 2009

(65) Prior Publication Data

US 2010/0162970 A1 Jul. 1, 2010

Related U.S. Application Data

(63) Continuation-in-part of application No. 12/390,512, filed on Feb. 23, 2009.

(30) Foreign Application Priority Data

Dec. 25, 2008 (TW) ................................ 97150762 A
Nov. 3, 2009 (TW) ................................ 98137312 A

(51) Int. Cl.
*F03C 1/00* (2006.01)
*F03B 13/00* (2006.01)
*F02B 43/08* (2006.01)

(52) U.S. Cl.
USPC ............................................... 60/531; 123/3

(58) Field of Classification Search ........ 123/3; 60/651; 310/10, 40 R
See application file for complete search history.

(56) References Cited

U.S. PATENT DOCUMENTS 2,707,863 A * 5/1955 Rhodes ........................... 60/669
4,165,614 A * 8/1979 Yeh ................................. 60/531

(Continued)

FOREIGN PATENT DOCUMENTS

CN 101225756 7/2008
JP 58-183876 10/1983

(Continued)

OTHER PUBLICATIONS

"Office Action of Taiwan counterpart application" issued on Jun. 7, 2012, p. 1-p. 10.

(Continued)

*Primary Examiner* — Lindsay Low
*Assistant Examiner* — Tea Holbrook
(74) *Attorney, Agent, or Firm* — Jianq Chyun IP Office

(57) ABSTRACT

A heat-pipe electric power generating device includes a heat pipe having an evaporating end and a condensing end, a non-magnetic shell connected to the condensing end, a generator stator coil disposed at the outer of the non-magnetic shell, a turbine disposed in the heat pipe, a driving axle connected to the turbine and extended into the non-magnetic shell, and a magnetic element disposed at the driving axle and located in the non-magnetic shell. A vapor flow flowing to the condensing end is generated at the evaporating end. The vapor flow drives the turbine to move the magnetic element, such that the generator stator coil generates an induced current. In addition, a hydrogen/oxygen gas generating apparatus and an internal combustion engine system having the heat-pipe electric power generating device are also provided.

31 Claims, 4 Drawing Sheets

U.S. PATENT DOCUMENTS

| | | | | |
|---|---|---|---|---|
| 4,186,559 | A * | 2/1980 | Decker et al. | 60/531 |
| 6,011,334 | A * | 1/2000 | Roland | 310/86 |
| 7,705,482 | B2 * | 4/2010 | Leininger | 290/55 |
| 7,723,860 | B2 * | 5/2010 | Nagler | 290/54 |
| 7,812,470 | B2 * | 10/2010 | Baarman et al. | 290/43 |
| 2003/0178184 | A1 * | 9/2003 | Kroliczek et al. | 165/104.26 |
| 2006/0222423 | A1 * | 10/2006 | Dejong et al. | 399/333 |
| 2006/0266043 | A1 * | 11/2006 | Jerome | 60/651 |
| 2007/0001462 | A1 | 1/2007 | McNeil | |
| 2007/0151709 | A1 * | 7/2007 | Touzov | 165/104.26 |
| 2007/0151969 | A1 * | 7/2007 | Tain et al. | 219/631 |
| 2007/0218706 | A1 * | 9/2007 | Matsuoka | 438/781 |
| 2008/0178589 | A1 * | 7/2008 | He et al. | 60/531 |
| 2008/0236794 | A1 * | 10/2008 | St. Louis | 165/104.19 |
| 2010/0162970 | A1 * | 7/2010 | Chen et al. | 123/3 |

FOREIGN PATENT DOCUMENTS

| | | |
|---|---|---|
| JP | S61-255202 | 11/1986 |
| JP | 2000-170505 | 6/2000 |
| TW | 200503907 | 2/2005 |
| TW | 200809085 | 2/2008 |
| WO | 9631750 | 10/1996 |
| WO | 2008/068491 | 6/2008 |

OTHER PUBLICATIONS

"First Office Action of China counterpart application" issued on Mar. 5, 2013, p1-p7, in which the listed references were cited.

* cited by examiner

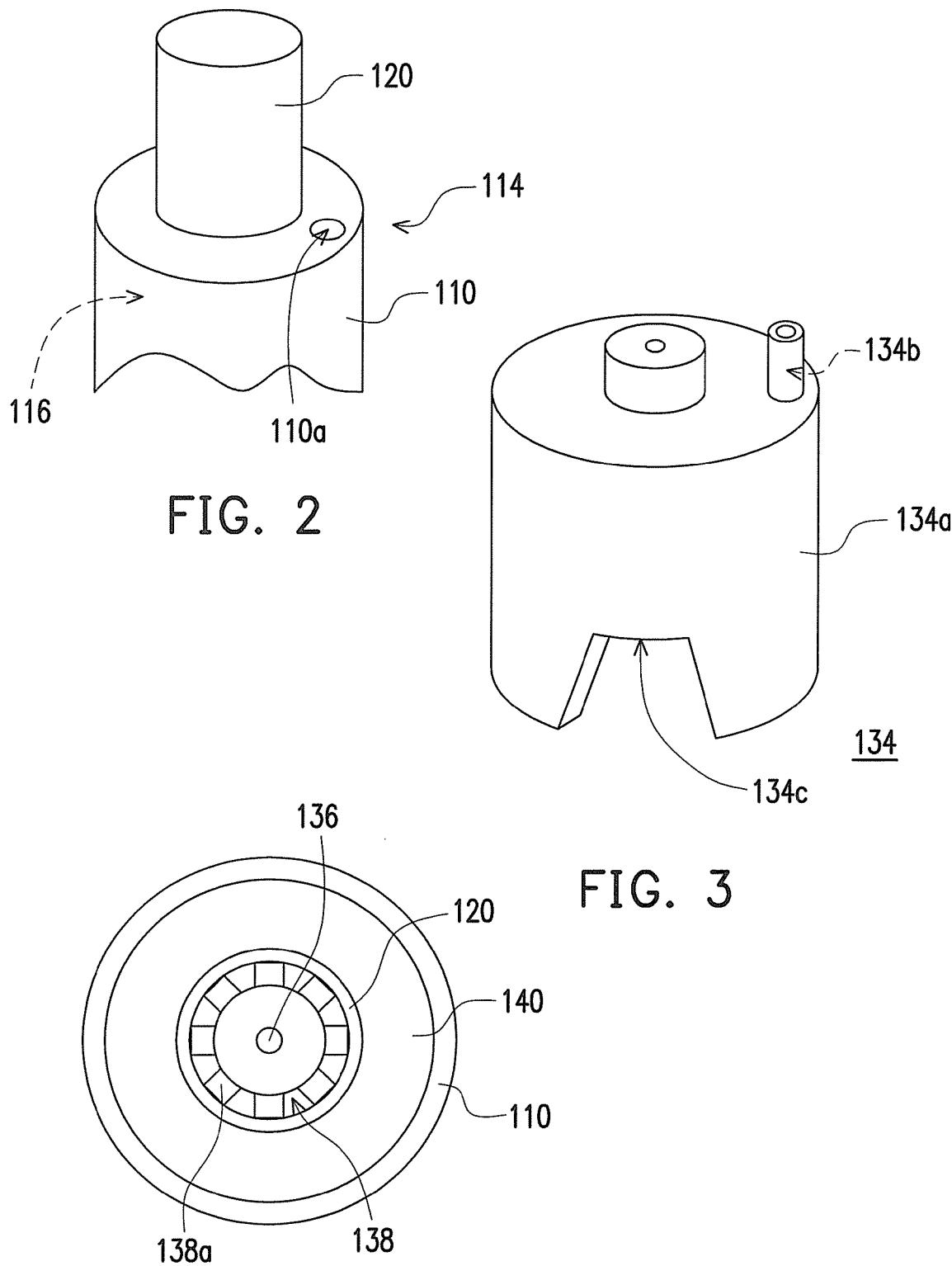

HEAT-PIPE ELECTRIC POWER GENERATING DEVICE AND HYDROGEN/OXYGEN GAS GENERATING APPARATUS AND INTERNAL COMBUSTION ENGINE SYSTEM HAVING THE SAME

CROSS-REFERENCE TO RELATED APPLICATION

This application is a continuation-in-part of and claims the priority benefit of patent application Ser. No. 12/390,512, filed on Feb. 23, 2009, now pending, which claims the priority benefit of Taiwan application serial no. 97150762, filed on Dec. 25, 2008. This application also claims the priority benefit of Taiwan application serial no. 98137312 filed on Nov. 3, 2009. The entirety of each of the above-mentioned patent applications is hereby incorporated by reference herein and made a part of this specification.

BACKGROUND

1. Technical Field

The disclosure relates to a technology of converting heat into electricity. More particularly, the disclosure relates to a heat-pipe electric power generating device applicable to a hydrogen/oxygen gas generating apparatus and an internal combustion engine system.

2. Description of Related Art

Energy is indispensible in our daily lives. The most common forms of energy are heat, electricity, and light, while energy can also be in other forms. Heat or electricity is of practical benefit. Nevertheless, low conversion efficiency sometimes results in waste energy that is expelled to the environment. For instance, an electronic device is operated because of electricity supply, while waste heat is simultaneously generated. The waste heat is normally dissipated into the environment and no longer used. Note that an efficient converting apparatus or system is needed when the desired energy is electricity but the available energy is in the form of light or heat.

The world is gradually running short of conventional energy that is frequently used now, e.g. petroleum. Therefore, economizing the use of energy by effectively employing and recycling the energy is an important issue nowadays. In comparison with the limited petroleum source, renewable solar energy that can be used for years is probably a favorable alternative. It is also likely to convert the solar energy into heat, electricity, and so on.

Accordingly, how to recycle and utilize waste heat and convert it into effective energy is an open issue to be resolved in haste. Besides, how to efficiently convert heat into electricity in order to employ the electricity from every aspect also draws attention of energy researchers.

In Taiwan patent publication no. 200809085, a heat-pipe electricity generator is disclosed. In the heat-pipe electric power generator, a magnet holder is disposed on a rotating blade of a fan in order to place magnets, and a pivot is disposed on a housing that holds the rotating blade of the fan. The pivot fits in with an axle center of the rotating blade of the fan. An airflow channel is disposed on the housing where the rotating blade of the fan is held. The airflow channel is located behind the rotating blade of the fan along a flowing direction of vapor.

In PCT patent publication no. WO2008/068491 A2, a heat-pipe electricity generator is disclosed. A heat pipe used in the heat-pipe electricity generator is formed by two metallic heat pipes in half and one non-metallic pipe sandwiched therebetween. A coil is embedded into the non-metallic pipe, and a blade of a fan having a magnetic material is located in the heat pipe corresponding to the non-metallic pipe. Thereby, rotation speed of the blade of the fan is not reduced by magnetic attraction between a magnetic element and the metallic heat pipes.

Additionally, in Japan patent application no. S61-255202, a heat-pipe electricity generator is disclosed. In this heat-pipe electricity generator, a rotating blade of a fan is disposed within a complete heat pipe, and there is magnetic substance in the rotating blade of the fan. A magnetic concentrating coil is disposed at an outer edge of the heat pipe corresponding to the location of the rotating blade of the fan, so as to generate current. Here, the heat pipe is a made of a non-magnetic material, such that the magnetic concentrating coil located outside the heat pipe can sense magnetic field change and then generate current.

SUMMARY

The disclosure is directed to a heat-pipe electric power generating device including a heat pipe, a non-magnetic shell, a magnetic field change generator, and a generator stator coil. The heat pipe has an evaporating end, a condensing end, and confined space between the evaporating end and the condensing end. A pressure difference exists between the evaporating end and the condensing end, such that a vapor flow flowing from the evaporating end to the condensing end is generated. The non-magnetic shell is connected to the condensing end and communicated with the confined space. The magnetic field change generator includes at least a turbine, a hollow shell, a driving axle, and a magnetic element. The turbine is disposed within the confined space. The hollow shell is disposed within the confined space and located between the turbine and the evaporating end. Besides, the hollow shell has a circular side wall, a vapor flow channel, and an opening located at the circular side wall. An end of the hollow shell contacts the evaporating end. The vapor flow channel faces the turbine. The circular side wall is adhered to an inner wall of the heat pipe. The driving axle is connected to the turbine and extended into the non-magnetic shell. The magnetic element is disposed at the driving axle and located within the non-magnetic shell. The generator stator coil is disposed at the outer of the non-magnetic shell. The vapor flow enters the hollow shell through the opening and is guided to the turbine through the vapor flow channel, such that the turbine is driven to move the magnetic element, and that the generator stator coil generates electric power.

The disclosure is further directed to a hydrogen/oxygen gas generating apparatus having a heat-pipe electric power generating device. The hydrogen/oxygen gas generating apparatus includes the aforesaid heat-pipe electric power generating device, a container, and a set of positive and negative electrodes. The container has a gas discharge vent, and an electrolytic solution fills the container. The set of positive and negative electrodes is disposed in the electrolytic solution and electrically connected to an electric power output end of the generator stator coil.

The disclosure is further directed to an internal combustion engine system having a heat-pipe electric power generating device. The internal combustion engine system includes the aforesaid heat-pipe electric power generating device, a container, a set of positive and negative electrodes, and an internal combustion engine. The container has a gas discharge vent, and an electrolytic solution fills the container. The set of positive and negative electrodes is disposed in the electrolytic solution and electrically connected to an electric power output end of the generator stator coil. The internal combustion engine is connected to the gas discharge vent, and a gas product discharged from the gas discharge vent serves as fuel of the internal combustion engine.

It is to be understood that both the foregoing general descriptions and the following detailed embodiments are exemplary and are, together with the accompanying drawings, intended to provide further explanation of technical features of the disclosure.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 is a three-dimensional view illustrating a non-magnetic shell depicted in FIG. 1.

FIG. 3 is a three-dimensional view illustrating a hollow shell depicted in FIG. 1.

FIG. 4 is a top view illustrating a partial structure of the heat-pipe electric power generating device depicted in FIG. 1.

DETAILED DESCRIPTION OF EMBODIMENTS

It is rather common to have heat pipes installed in conventional thermal devices. Researches on the conventional heat pipes are made to further design a heat pipe for electricity generation according to this disclosure. Following embodiments of the disclosure are merely illustrative of certain applications of the principle of the disclosure but are not intended to limit the disclosure.

Figure 1:
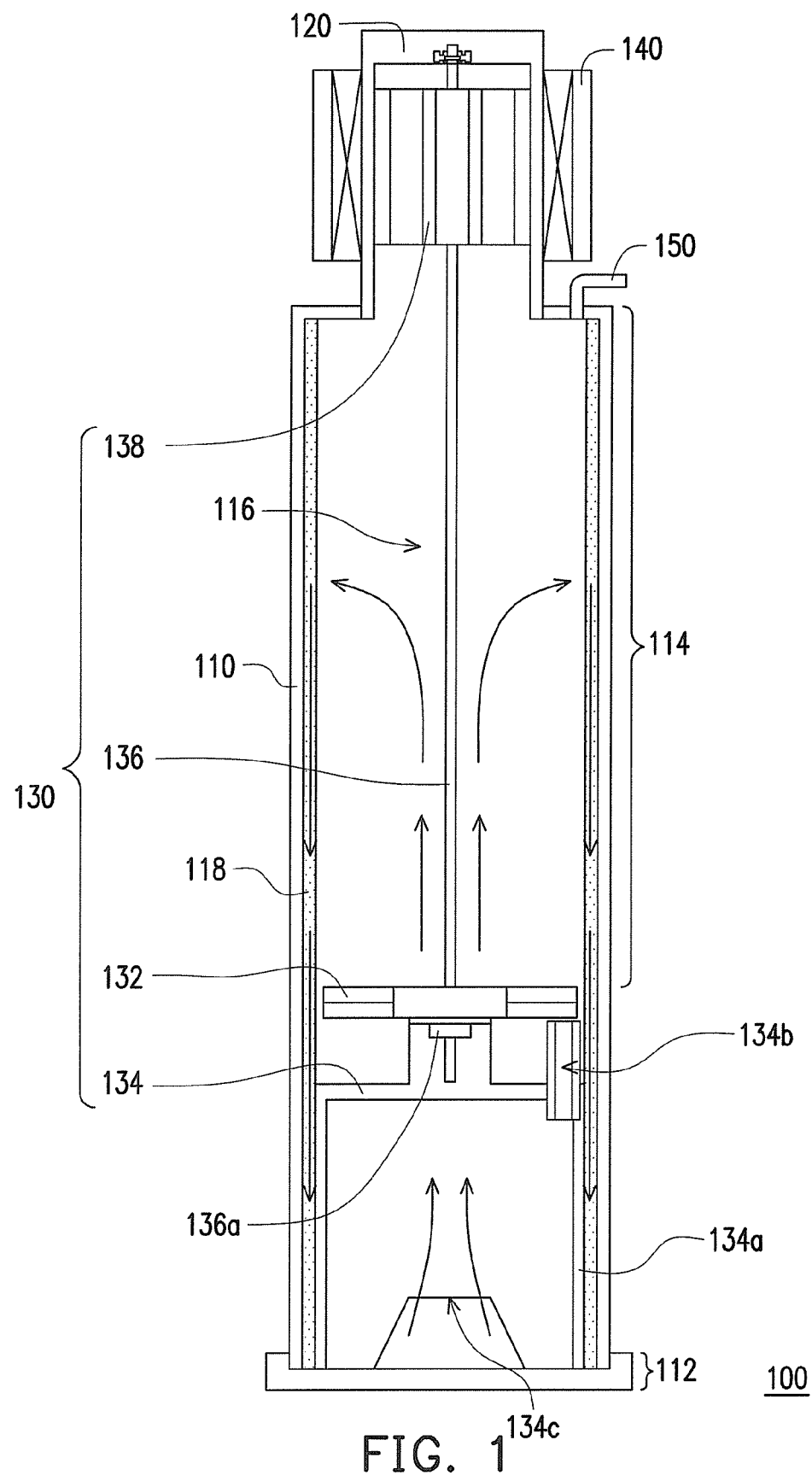
FIG. 1 is a side view illustrating a heat-pipe electric power generating device according to an embodiment of the disclosure.

FIG. 1 is a side view illustrating a heat-pipe electric power generating device according to an embodiment of the disclosure. As indicated in FIG. 1, a heat-pipe electric power generating device 100 of this embodiment includes a heat pipe 110, a non-magnetic shell 120, a magnetic field change generator 130, and a generator stator coil 140. A material of the heat pipe 110 is, for example, copper or aluminum. Besides, the heat pipe 110 has an evaporating end 112, a condensing end 114, and confined space 116 between the evaporating end 112 and the condensing end 114. A pressure difference exists between the evaporating end 112 and the condensing end 114, such that a vapor flow flowing from the evaporating end 112 to the condensing end 114 is generated. FIG. 2 is a three-dimensional view illustrating a non-magnetic shell depicted in FIG. 1. With reference to FIG. 2, the non-magnetic shell 120 is connected to the condensing end 114 of the heat pipe 110 and communicated with the confined space 116. Here, a material of the non-magnetic shell 120 is, for example, ceramic or glass, which is not limited in this disclosure. Namely, the non-magnetic shell 120 can also be made of other appropriate non-magnetic materials.

In FIG. 1, the magnetic field change generator 130 includes a turbine 132, a hollow shell 134, a driving axle 136, and a magnetic element 138. The turbine 132 is disposed within the confined space 116. The hollow shell 134 is disposed within the confined space 116 and located between the turbine 132 and the evaporating end 112. The driving axle 136 of this embodiment has a bearing 136a connected to a top of the hollow shell 134 and pivoted to a center of the turbine 132. FIG. 3 is a three-dimensional view illustrating a hollow shell depicted in FIG. 1. In FIG. 3, a material of the hollow shell 134 is, for example, polytetrafluoroethene (PTFE, i.e. teflon) or polyether ether ketone (PEEK). Besides, the hollow shell 134 has a circular side wall 134a, a vapor flow channel 134b, and an opening 134c located at the circular side wall 134a. An end of the hollow shell 134 contacts the evaporating end 112, the vapor flow channel 134b faces the turbine 132, and the circular side wall 134a is adhered to an inner wall of the heat pipe 110.

The driving axle 136 is connected to the turbine 132 and extended into the non-magnetic shell 120. The magnetic element 138 is disposed at the driving axle 136 and located within the non-magnetic shell 120. The generator stator coil 140 is, for example, an electricity-collecting ring, and the generator stator coil 140 is disposed at the outer of the non-magnetic shell 120. The vapor flow generated at the evaporating end 112 enters the hollow shell 134 through the opening 134c and is guided to the turbine 132 through the vapor flow channel 134b, such that the turbine 132 is rotated and driven to rotate the magnetic element 138 via the driving axle 136, and that the generator stator coil 140 generates electric power. Note that the magnetic element 138 of this embodiment is located within the non-magnetic shell 120. Therefore, during operation of the magnetic element 138, no magnetic attraction is generated between the magnetic element 138 and the heat pipe 110 made of the metallic material. Thereby, rotation speed of the turbine 132 is not reduced by the magnetic attraction. In addition, the movement of the turbine 132 can be rotation or reciprocation, which is not limited in this disclosure.

The non-magnetic shell 120 of this embodiment can be connected to and communicated with the heat pipe 110 via sintering, so as to maintain gas-tight condition of the confined space 116. Besides, the non-magnetic shell 120 can also be connected to the heat pipe 110 via welding. To be more specific, a metal layer can be sputtered on a portion of the non-magnetic shell 120 to be bonded to the heat pipe 110, and the thickness of the metal layer can be increased through electroplating or electrochemical deposition. After that, the metal layer is secured onto the heat pipe 110 via welding. After the non-magnetic shell 120 is connected to the heat pipe 110, thermal media can be conducted into the heat pipe 110 through a conducting pipe 150 illustrated in FIG. 1, and the conducting pipe 150 is then sealed to form the confined space 116 within the heat pipe 110. With reference to FIG. 2, for instance, the heat pipe 110 has a via 110a to be plugged by the conducting pipe 150 shown in FIG. 1. The thermal media include fluids featuring low saturated vapor pressure, such as water or other substances in liquid form. Owing to principles of latent heat of fusion and latent heat of vaporization, the low saturated vapor pressure results in temperature reduction of vaporized liquid and facilitates condensation. Further, heat is released when gas is condensed; heat is absorbed when liquid is vaporized.

Operation principles of the heat-pipe electric power generating device 100 are further described hereinafter according to this embodiment. See FIG. 1. A wick structure 118 is disposed at the inner wall of the heat pipe 110. Here, for instance, copper powder is sintered at the inner wall of the heat pipe 110 to form the wick structure 118. After the evaporating end 112 is heated, it is at a relatively high temperature and under high pressure. Liquid at the evaporating end 112 is within the critical range of temperature during absorption of latent heat and is vaporized beyond the critical temperature. Vapor pressure is far greater than liquid pressure, thus producing a large vapor flow from a small amount of liquid, and the vapor flows to the condensing end 114. Vapor generated at the evaporating end 112 of the heat pipe 110 enters the hollow shell 134 via the opening 134c located at the hollow shell 134.

When the vapor passes through the vapor flow channel 134b constituted by a nozzle, for example, the vapor is conducted to the turbine 132 at a pressure higher than the saturated vapor pressure, and therefore the speed of the vapor is increased. When the vapor passes through the turbine 132, the turbine 132 is rotated and driven to move the magnetic element 138 via the driving axle 136. Hence, relative movement is constructed between the magnetic element 138 and the generator stator coil 140 outside the non-magnetic shell 120. Thereby, magnetic field over the generator stator coil 140 is changed to generate an induced current. After the vapor passes the turbine 132, it reaches the condensing end 114 of the heat pipe 110 and releases energy at the condensing end 114, such that the vapor is condensed into liquid at the inner wall of the heat pipe 110. The liquid is then sent back to the evaporating end 112 via the wick structure 118 and evaporated again. The circulation described herein is shown in FIG. 1 by arrows. By doing so over and over, heat dissipation and electricity generation are accomplished.

FIG. 4 is a top view illustrating a partial structure of the heat-pipe electric power generating device depicted in FIG. 1. It should be mentioned that the top structure of the non-magnetic shell 120 is omitted in FIG. 4 for the purpose of clarification. Thereby, the driving axle 136 and the magnetic element 138 located within the non-magnetic shell 120 can be directly observed from FIG. 4. In FIG. 4, the generator stator coil 140 of this embodiment surrounds the non-magnetic shell 120 and corresponds to the magnetic element 138. The magnetic element 138 is, for example, formed by a plurality of magnets 138a surrounding the driving axle 136, and the movement of the magnetic element 138 is driven by rotation of the driving axle 136, such that the generator stator coil 140 can generate the induced current.

Note that the side wall 134a of the hollow shell 134 is adhered to the inner wall of the heat pipe 110 according to this embodiment. Therefore, condensation of vapor can be prevented before the vapor arrives at the turbine 132, and the vapor is then not allowed to enter the wick structure 118 at the inner wall of the heat pipe 110. As such, performance of the heat-pipe electric power generating device 100 can be improved. Besides, the vapor flow channel 134b of this embodiment is located in front of the turbine 132 along a flowing direction of the vapor. When the vapor passes through the vapor flow channel 134b, the vapor is conducted to the turbine 132 at the pressure higher than the saturated vapor pressure. Thereby, the speed of the vapor can be increased, and electricity can be generated more efficiently. On the other hand, the heat pipe 110 is integrally formed, and no seam is formed on the wall of the heat pipe 110, so as to maintain gas-tight condition within the heat pipe 110. Moreover, the generator stator coil 140 is disposed around the non-magnetic shell 120 but not within the heat pipe 110. Hence, fabrication of the heat pipe 110 is rather simple, and manufacturing costs can be reduced as well.

Nevertheless, other arrangements are also applicable in addition to the above-mentioned arrangement. Namely, modifications complying with the theory of electromagnetic energy generation are all allowed. For instance, the magnetic element 138 can be secured onto the inner wall of the non-magnetic shell 120, and the generator stator coil 140 is disposed on the driving axle 136. Through the aforesaid mechanism of rotation, the generator stator coil 140 is rotated, and electricity can also be generated in this way. Besides, the turbine 132 is not limited to be located at the center of the heat pipe 110. Instead, the turbine 132 can be disposed at any location as long as the vapor flow can be utilized. Additionally, the heat pipe is not necessarily a straight pipe. Moreover, in this embodiment, the condensed vapor in liquid form is apt to flow back because of gravity. Practically, the heat-pipe electric power generating device 100 is arranged vertically, and the evaporating end 112 is located at the bottom portion of the heat pipe 110 to improve efficiency. Note that the heat-pipe electric power generating device 100 can also be arranged in a horizontal manner.

Figure 5:
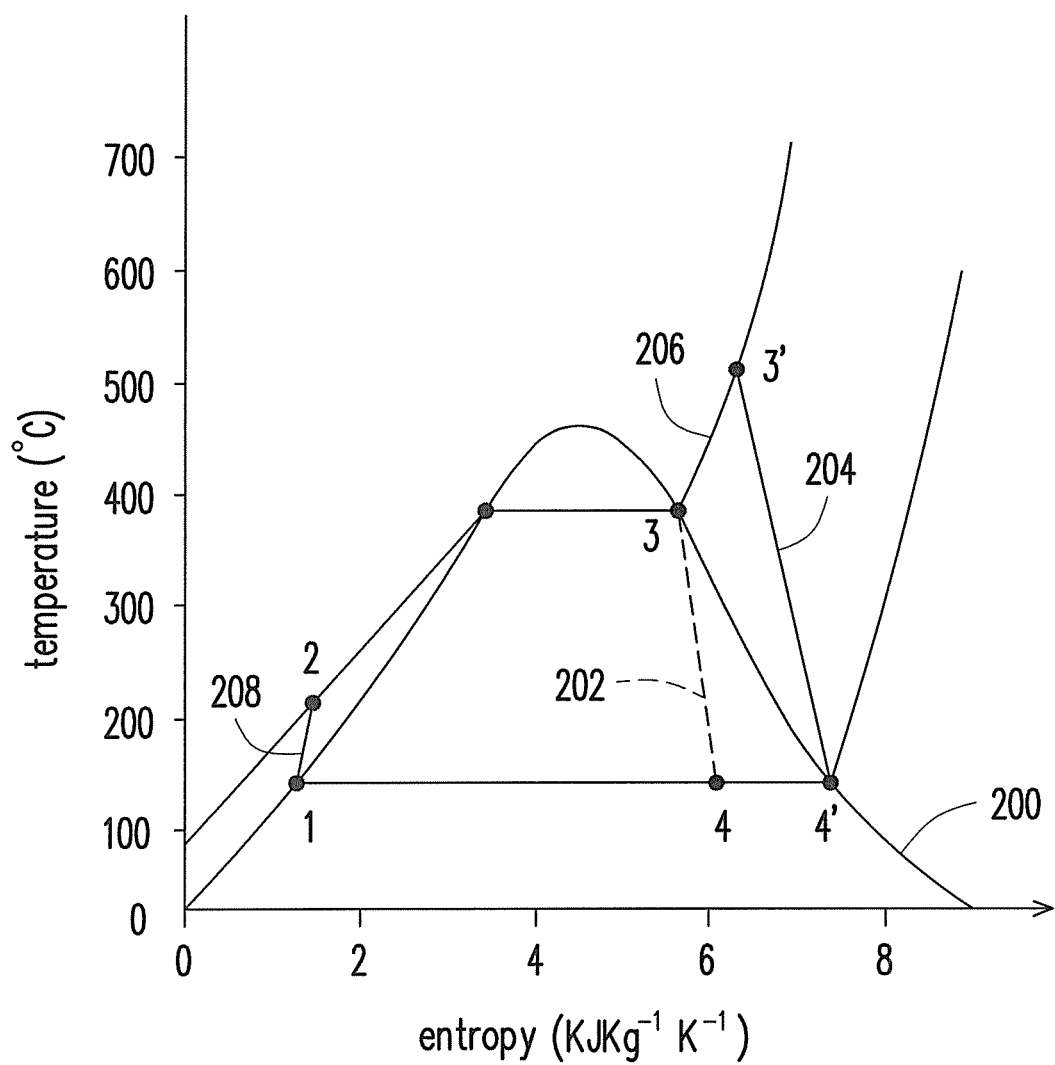
FIG. 5 is a schematic thermal work diagram illustrating the heat-pipe electric power generating device depicted in FIG. 1.

In accordance with thermal physics, a phase diagram of vapor phase and liquid phase is provided below to elaborate the operation of the heat-pipe electric power generating device 100 in this embodiment. FIG. 5 is a schematic thermal work diagram illustrating the heat-pipe electric power generating device depicted in FIG. 1. As shown in FIG. 5, the horizontal axis is set as entropy S, and the vertical axis is set as temperature T, for example. The graph surrounded by points 1, 2, 3, and 4 refers to a common cycle, while the graph surrounded by points 1, 2, 3', and 4' refers to a superheat cycle. An area above a saturated vapor curve 200 represents high pressure, an area at left of the top point represents liquid phase, and an area at right of the top point represents vapor phase. Besides, an area below the saturated vapor curve 200 represents a mixed area of the vapor phase and the liquid phase at low pressure. A path 208 from point 1 to point 2 shows properties of constant entropy compression. A path 202 from point 3 to point 4 and a path 204 from point 3' to point 4' correlate with electricity generation of the turbine 132. That is to say, the path 202 from point 3 to point 4 means the turbine 132 depicted in FIG. 1 is driven by the saturated vapor; the path 204 from point 3' to point 4' means the turbine 132 is driven by the vapor at high temperature and high pressure. The path 206 means benefit generated by a heat source evaporator. Eternally, the vapor starts to condense at point 4' and then returns to point 1. The efficiency of electricity generation increases with the vapor speed.

In the heat-pipe electric power generating device 100, vapor enters the hollow shell 134 via the opening 134c located at the hollow shell 134. Before the vapor passes through the vapor flow channel 134b and conducted to the turbine 132, vapor can be concentrated into the hollow shell 134, such that the vapor can be conducted to the turbine 132 at a pressure higher than the saturated vapor pressure. Thereby, the vapor speed is increased. In the heat-pipe electric power generating device 100 of the embodiment, the turbine 132 is driven by vapor at high temperature and high pressure, and electricity is generated in the manner as indicated by the path 204 from point 3' to point 4' depicted in FIG. 5.

Figure 6:
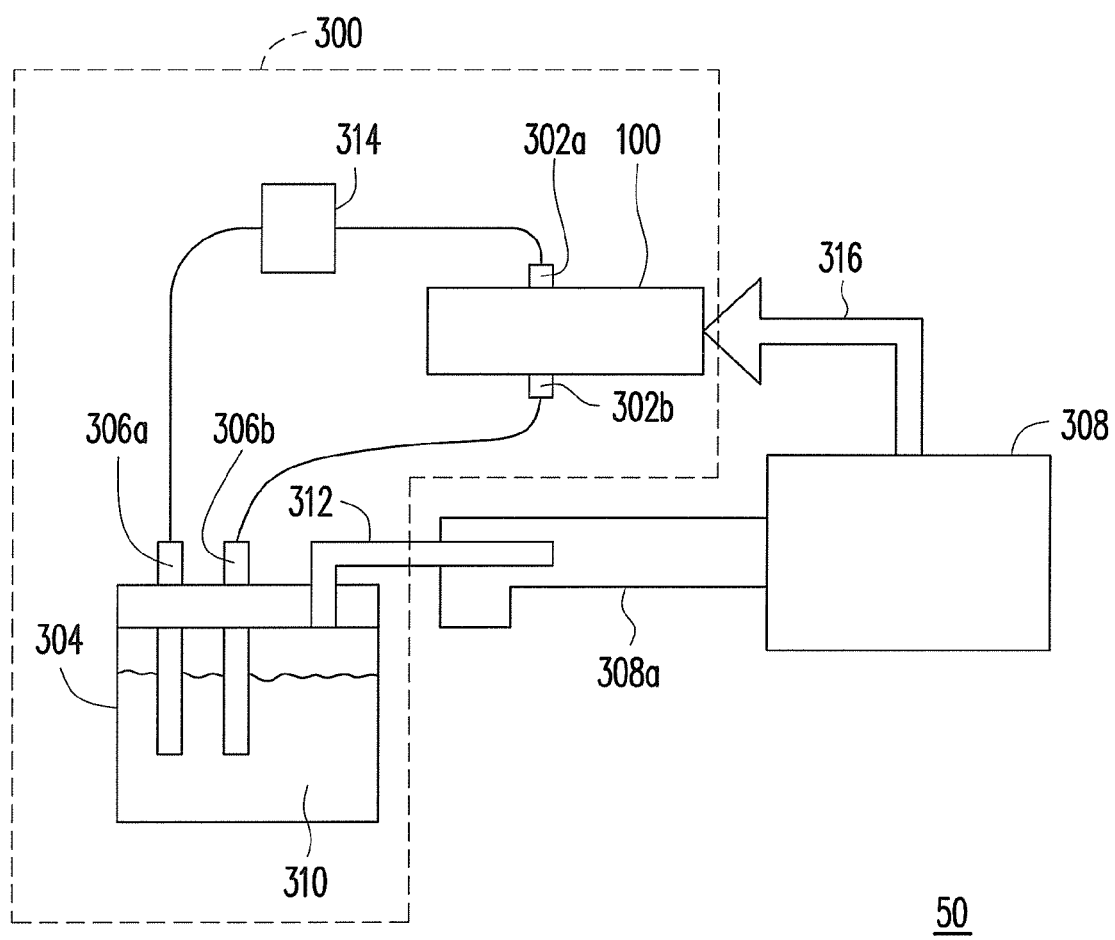
FIG. 6 is a schematic view illustrating an internal combustion engine system having the heat-pipe electric power generating device depicted in FIG. 1.

The heat-pipe electric power generating device of this embodiment is applicable to a hydrogen/oxygen gas generating apparatus and can be further combined to an internal combustion engine system. An internal combustion engine system having the heat-pipe electric power generating device is then described hereinafter. FIG. 6 is a schematic view illustrating an internal combustion engine system having the heat-pipe electric power generating device depicted in FIG. 1. In FIG. 6, the internal combustion engine system 50 having a heat-pipe electric power generating device includes the heat-pipe electric power generating device 100, a container 304, a set of positive and negative electrodes 306a and 306b, and an internal combustion engine 308. The heat-pipe electric power generating device 100, the container 304, and the set of positive and negative electrodes 306a and 306b together form a hydrogen/oxygen gas generating apparatus 300.

The structure of the heat-pipe electric power generating device 100 is explained above, and therefore no further explanation is provided herein. An electrolytic solution 310 fills the container 304, and the container 304 has a gas discharge vent 312. The electrolytic solution 310 is electrolytic water, for example. The set of positive and negative electrodes 306a and 306b are disposed in the electrolytic solution 310 in the container 304 and electrically connected to electric power output ends 302a and 302b of the generator stator coil 140 (depicted in FIG. 1) in the heat-pipe electric power generating device 100.

The internal combustion engine 308 is connected to the gas discharge vent 312, and a gas product discharged from the gas discharge vent 312 serves as fuel of the internal combustion engine 308. The internal combustion engine 308 has an air-introducing pipe 308a. The air-introducing pipe 308a of the internal combustion engine 308 is communicated with the gas discharge vent 312 of the hydrogen/oxygen gas generating apparatus 300. Hence, the gas product (the hydrogen gas and the oxygen gas) of the hydrogen/oxygen gas generating apparatus 300 can be mixed with air and guided into the internal combustion engine 308, so as to improve combustion efficiency of the internal combustion engine 308 and reduce air pollution. After the operation of the internal combustion engine 308, heat generated by the internal combustion engine 308 can be conducted to the evaporating end 112 (depicted in FIG. 1) of the heat pipe 110 via a heat-conducting element 316 connected between the heat-pipe electric power generating device 100 and the internal combustion engine 308. The heat-conducting element 316 can be a cooling radiator for cooling the internal combustion engine 308. Besides, the generator stator coil 140 (depicted in FIG. 1) can have a rectifying device 314 converting alternating current generated by the generator stator coil 140 to direct current.

Operation principles of the internal combustion engine system 50 having the heat-pipe electric power generating device of this embodiment are then elaborated.

First of all, a fuel tank (not shown) supplies fuel to the internal combustion engine 308, such that the internal combustion engine 308 is operated and then generates power and heat. The heat is transmitted to the evaporating end 112 (depicted in FIG. 1) of the heat pipe 110 in the heat-pipe electric power generating device 100, so as to drive the heat-pipe electric power generating device 100. After the operation of the heat-pipe electric power generating device 100, electricity is generated and supplied to a set of positive and negative electrodes 306a and 306b. Besides, the electrolytic solution 310 in the container 304 is electrolyzed to produce a gas product (hydrogen gas and oxygen gas). The gas product (hydrogen gas and oxygen gas) is discharged from the gas discharge vent 312, mixed with the air, and then introduced into the internal combustion engine 308, so as to improve combustion efficiency of the internal combustion engine 308 and reduce air pollution.

Namely, the hydrogen/oxygen gas generating apparatus 300 having the heat-pipe electric power generating device 100 can conduct electricity generated by the heat-pipe electric power generating device 100 directly into the container 304, so as to electrolyze water and produce the hydrogen gas and the oxygen gas. In addition, the heat-pipe electric power generating device 100 in the internal combustion engine system 50 can transform waste heat into electricity, and the electricity is directly provided to the hydrogen/oxygen gas generating apparatus 300 having the heat-pipe electric power generating device 100 for producing the hydrogen gas and the oxygen gas. The hydrogen gas and the oxygen gas are then mixed with the air at an air-introducing opening, introduced into the internal combustion engine 308, and combusted together with oil gas, so as to improve the power efficiency of the internal combustion engine system 50 and the internal combustion engine 308 and reduce waste air discharge. That is to say, the internal combustion engine system 50 having the heat-pipe electric power generating device can transform the waste heat into electricity and employ the electricity to produce the hydrogen gas and the oxygen gas that serve as fuel and are introduced into the internal combustion engine 308. Thereby, energy conservation can be achieved.

In light of foregoing, the hollow shell of the heat-pipe electric power generating device has the vapor flow channel which conducts the vapor flow generated within the heat pipe to the turbine according to this disclosure. The vapor flow channel is disposed in front of the turbine along the flowing direction of the vapor, and therefore the turbine can be driven by the vapor to a better extent. In addition, an end of the hollow shell contacts the evaporating end of the heat pipe, and the hollow shell has an opening, such that the vapor generated at the inner wall of the heat pipe is allowed to enter the hollow shell through the opening. The circular side wall of the hollow shell is adhered to the inner wall of the heat pipe, so as to prevent the vapor from condensing and entering the wick structure at the inner wall of the heat pipe before the vapor reaches the turbine. On the other hand, the heat pipe in the heat-pipe electric power generating device is integrally formed, and thus no seam is formed on the wall of the heat pipe, so as to maintain gas-tight condition within the heat pipe.

Moreover, the generator stator coil of this disclosure is disposed around the non-magnetic shell but not within the heat pipe. Hence, fabrication of the heat pipe is rather simple, and manufacturing costs can be reduced as well. Additionally, the magnetic element is disposed within the non-magnetic shell. Therefore, when the magnetic element is driven by the turbine, the rotation speed of the turbine is not reduced by the magnetic attraction between the magnetic element and the heat pipe. Further, the magnetic element is not directly disposed on the turbine but on the driving axle of the turbine, and therefore the turbine can have flexible structural design.

According to this disclosure, the hydrogen/oxygen gas generating apparatus having the heat-pipe electric power generating device can conduct electricity generated by the heat-pipe electric power generating device directly into a water tank, so as to electrolyze water and produce the hydrogen gas and the oxygen gas. Besides, the internal combustion engine system having the heat-pipe electric power generating device can transform waste heat into electricity and employ the electricity to produce the hydrogen gas and the oxygen gas that serve as fuel and are introduced into the internal combustion engine according to this disclosure, so as to improve power efficiency of the internal combustion engine and reduce waste air discharge. Thereby, energy conservation can be achieved.

The heat-pipe electric power generating device of this disclosure can also be disposed in any apparatus capable of generating heat energy. As such, an apparatus having a function of recycling heat can be formed. For instance, the heat-pipe electric power generating device can be integrated with a vehicle discharge system or installed in a computer system for heat dissipation and heat recycling. Since an air conditioner is one of the apparatuses generating a great amount of waste heat, it is also likely to combine the heat-pipe electric power generating device described in this disclosure into the air conditioner for waste heat recycling. Similar applications are not enumerated herein.

To sum up, the heat pipe is utilized in the heat-pipe electric power generating device of this disclosure to recycle or use heat and transform the heat into electricity. The heat-pipe electric power generating device of this disclosure is an alternative in consideration of energy management.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A heat-pipe electric power generating device, comprising:
    a heat pipe having an evaporating end, a condensing end, and a confined space between the evaporating end and the condensing end, wherein a pressure difference exists between the evaporating end and the condensing end, such that a vapor flow flowing from the evaporating end to the condensing end is generated;
    a non-magnetic shell connected to the condensing end and communicating with the confined space;
    a magnetic field change generator comprising:
        at least a turbine disposed within the confined space;
        a hollow shell disposed within the confined space and located between the at least a turbine and the evaporating end, the hollow shell having a circular side wall, a vapor flow channel, and an opening located at the circular side wall, wherein an end of the hollow shell contacts the evaporating end, the vapor flow channel faces the at least a turbine, and the circular side wall is adhered to an inner wall of the heat pipe;
        a driving axle connected to the at least a turbine and extended into the non-magnetic shell;
        a magnetic element disposed at the driving axle and located within the non-magnetic shell; and
    a generator stator coil disposed at the outer of the non-magnetic shell, wherein the vapor flow enters the hollow shell through the opening and is guided to the at least a turbine through the vapor flow channel, such that the at least a turbine is driven to move the magnetic element, and that the generator stator coil generates electric power.

2. The heat-pipe electric power generating device as claimed in claim 1, wherein a material of the non-magnetic shell is ceramic or glass.

3. The heat-pipe electric power generating device as claimed in claim 1, wherein a wick structure is disposed at the inner wall of the heat pipe.

4. The heat-pipe electric power generating device as claimed in claim 1, wherein a material of the heat pipe is copper or aluminum.

5. The heat-pipe electric power generating device as claimed in claim 1, wherein a material of the hollow shell is polytetrafluoroethene (PTFE) or polyether ether ketone (PEEK).

6. The heat-pipe electric power generating device as claimed in claim 1, wherein the movement of the at least a turbine is rotation or reciprocation.

7. The heat-pipe electric power generating device as claimed in claim 1, wherein the driving axle has a bearing connected to a top of the hollow shell and pivoted to a center of the at least a turbine.

8. The heat-pipe electric power generating device as claimed in claim 1, wherein the non-magnetic shell is connected to the heat pipe by sintering or welding.

9. A hydrogen/oxygen gas generating apparatus having a heat-pipe electric power generating device, the hydrogen/oxygen gas generating apparatus comprising:
    the heat-pipe electric power generating device as claimed in claim 1;
    a container having a gas discharge vent, an electrolytic solution filling the container; and
    a set of positive and negative electrodes disposed in the electrolytic solution and electrically connected to an electric power output end of the generator stator coil.

10. The hydrogen/oxygen gas generating apparatus as claimed in claim 9, wherein a material of the non-magnetic shell is ceramic or glass.

11. The hydrogen/oxygen gas generating apparatus as claimed in claim 9, wherein a wick structure is disposed at the inner wall of the heat pipe.

12. The hydrogen/oxygen gas generating apparatus as claimed in claim 9, wherein a material of the heat pipe is copper or aluminum.

13. The hydrogen/oxygen gas generating apparatus as claimed in claim 9, wherein a material of the hollow shell is polytetrafluoroethene (PTFE) or polyether ether ketone (PEEK).

14. The hydrogen/oxygen gas generating apparatus as claimed in claim 9, wherein the movement of the at least a turbine is rotation or reciprocation.

15. The hydrogen/oxygen gas generating apparatus as claimed in claim 9, wherein the driving axle has a bearing connected to a top of the hollow shell and pivoted to a center of the at least a turbine.

16. The hydrogen/oxygen gas generating apparatus as claimed in claim 9, wherein the non-magnetic shell is connected to the heat pipe by sintering or welding.

17. The hydrogen/oxygen gas generating apparatus as claimed in claim 9, wherein the generator stator coil has a rectifying device converting alternating current generated by the generator stator coil to direct current.

18. The hydrogen/oxygen gas generating apparatus as claimed in claim 9, wherein the electrolytic solution is electrolytic water.

19. An internal combustion engine system having a heat-pipe electric power generating device, the internal combustion engine system comprising:
    the heat-pipe electric power generating device as claimed in claim 1;
    a container having a gas discharge vent, an electrolytic solution filling the container;
    a set of positive and negative electrodes disposed in the electrolytic solution and electrically connected to an electric power output end of the generator stator coil; and
    an internal combustion engine connected to the gas discharge vent, wherein a gas product discharged from the gas discharge vent serves as fuel of the internal combustion engine.

20. The internal combustion engine system as claimed in claim 19, wherein a material of the non-magnetic shell is ceramic or glass.

21. The internal combustion engine system as claimed in claim 19, wherein a wick structure is disposed at the inner wall of the heat pipe.

22. The internal combustion engine system as claimed in claim 19, wherein a material of the heat pipe is copper or aluminum.

23. The internal combustion engine system as claimed in claim 19, wherein a material of the hollow shell is polytetrafluoroethene (PTFE) or polyether ether ketone (PEEK).

24. The internal combustion engine system as claimed in claim 19, wherein the movement of the at least a turbine is rotation or reciprocation.

25. The internal combustion engine system as claimed in claim 19, wherein the driving axle has a bearing connected to a top of the hollow shell and pivoted to a center of the at least a turbine.

26. The internal combustion engine system as claimed in claim 19, wherein the non-magnetic shell is connected to the heat pipe by sintering or welding.

27. The internal combustion engine system as claimed in claim 19, wherein the generator stator coil has a rectifying device converting alternating current generated by the generator stator coil to direct current.

28. The internal combustion engine system as claimed in claim 19, wherein the electrolytic solution is electrolytic water.

29. The internal combustion engine system as claimed in claim 19, further comprising:
   a heat-conducting element connected between the heat-pipe electric power generating device and the internal combustion engine to conduct heat generated by the internal combustion engine to the evaporating end.

30. The internal combustion engine system as claimed in claim 29, wherein the heat-conducting element is a cooling radiator for cooling the internal combustion engine.

31. The internal combustion engine system as claimed in claim 19, wherein the internal combustion engine has an air-introducing pipe communicated with the gas discharge vent.

* * * * *